United States Patent [19]

Vassiliou et al.

[11] Patent Number: 5,094,935
[45] Date of Patent: Mar. 10, 1992

[54] METHOD AND APPARATUS FOR FABRICATING THREE DIMENSIONAL OBJECTS FROM PHOTOFORMED PRECURSOR SHEETS

[75] Inventors: Eustathios Vassiliou, Newark, Del.; John A. Lawton, Landenberg, Pa.

[73] Assignee: E. I. DuPont de Nemours and Company, Wilmington, Del.

[21] Appl. No.: 543,388

[22] Filed: Jun. 26, 1990

[51] Int. Cl.$^5$ .............................................. G03C 9/08
[52] U.S. Cl. ...................................... 430/320; 430/269;
430/394; 430/396; 430/945; 156/58; 156/59; 264/22
[58] Field of Search ................. 430/22, 269, 320, 321, 430/396, 327, 331, 394, 945; 156/58, 59; 425/174, 174.4; 264/22

[56] References Cited

U.S. PATENT DOCUMENTS

| | | | |
|---|---|---|---|
| 2,775,758 | 12/1956 | Munz | 343/17 |
| 4,575,330 | 3/1986 | Hull | 425/174.4 |
| 4,752,352 | 6/1988 | Feygin | 156/630 |
| 4,752,498 | 6/1988 | Fudim | 427/54.1 |
| 4,801,477 | 1/1989 | Fudim | 427/54.1 |

FOREIGN PATENT DOCUMENTS

| | | |
|---|---|---|
| 0250121 | 12/1987 | European Pat. Off. . |
| 1218831 | 9/1989 | Japan . |
| 8910249 | 11/1989 | PCT Int'l Appl. .......... 156/58 |

OTHER PUBLICATIONS

"Automatic Method for Fabricating a 3-D Plastic Model with Photohardening Polymer" Kodama, H., Rev. Sci. Instrum. 52(11), Nov. 1981. pp. 1770–1773.

A Review of 3D Solid Object Generation, A. J. Herbert, 1989, SPSE—The Society for Imaging Science and Technology, pp. 186–190.

Solid Object Generation, Alan J. Herbert, 1982, Society of Photographic Scientists and Engineers, pp. 185–188.

Primary Examiner—Richard L. Schilling
Assistant Examiner—Kathleen Duda
Attorney, Agent, or Firm—Thomas H. Magee

[57] ABSTRACT

An imaging method and apparatus produces an integral three-dimensional object from a multiplicity of cross sectional portions of the object. The cross sectional portions correspond to photohardened portions of contiguous photoformed precursor sheets of a photohardenable liquid composition.

12 Claims, 2 Drawing Sheets

METHOD AND APPARATUS FOR FABRICATING THREE DIMENSIONAL OBJECTS FROM PHOTOFORMED PRECURSOR SHEETS

BACKGROUND OF THE INVENTION

1. Field of the Invention

This invention pertains to a method and apparatus for fabricating an integral three-dimensional object from a multiplicity of cross sectional portions of the object. The cross sectional portions correspond to photohardened portions of contiguous photoformed precursor sheets of a photohardenable liquid composition.

2. Description of Related Art

Many systems for production of three-dimensional modeling by photohardening have been proposed. European Patent Application No. 250,121 filed by Scitex Corporation Ltd., on June 5, 1987, discloses a three-dimensional modeling apparatus using a solidifiable liquid, and provides a good summary of documents pertinent to this art. U.S. Pat. No. 4,575,330, issued to C. W. Hull on Mar. 11, 1986, describes a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction. Successive adjacent laminae, representing corresponding successive adjacent cross-sections of the object, are automatically formed and integrated together to provide a step-wise laminar buildup of the desired object, whereby a three-dimensional object is formed and drawn from a substantially planar surface of the fluid medium during the forming process. U.S. Pat. No. 4,752,498, issued to E. V. Fudim on June 21, 1988, describes an improved method of forming three-dimensional objects, which comprises irradiating an uncured photopolymer by transmitting an effective amount of photopolymer solidifying radiation through a radiation transmitting material which is in contact with the uncured liquid photopolymer. The transmitting material is a material which leaves the irradiated surface capable of further crosslinking so that when subsequent layer is formed it will adhere thereto. Using this method, multilayer objects can be made. U.S. Pat. No. 4,801,477, issued also to Fudim on Jan. 31, 1989, mention is made of a light guide, which may be made of material containing copper, oxygen, or other ingredients that may inhibit photopolymer cross linking.

A publication entitled "Automatic Method for fabricating a three-dimensional plastic model with photohardening polymer" by Hideo Kodama, Rev. Sci. Instrum. 52(11), 1770–1773, Nov. 1981, describes a method for automatic fabrication of a three-dimensional plastic model. The solid model is fabricated by exposing liquid photohardening polymer to ultraviolet rays, and stacking the cross-sectional solidified layers. A publication entitled "Solid Object Generation" by Alan J Herbert, Journal of Applied Photographic Engineering, 8(4), 185–188, Aug. 1982, describes an apparatus which can produce a replica of a solid or three-dimensional object much as a photocopier is capable of performing the same task for a two-dimensional object. The apparatus is capable of generating, in photopolymer, simple three-dimensional objects from information stored in computer memory. A good review of the different methods is also given by a most recent publication entitled "A review of 3D Solid Object Generation" by A. J. Herbert, Journal of Imaging Technology 15:186–190 (1989).

Most of these approaches relate to the formation of solid sectors of three-dimensional objects in steps by sequential irradiation of areas or volumes sought to be solidified. Various masking techniques are described as well as the use of direct laser writing, i.e., exposing a photohardenable composition with a laser beam according to a desired pattern and building a three-dimensional model, layer by layer. In addition to various exposure techniques, several methods of creating thin liquid layers are described which allow both coating a platform initially and coating successive layers previously exposed and solidified.

The aforementioned methods of coating, however, are not capable of ensuring flat uniform layer thickness or of producing such layers quickly, or they do not effectively prevent damage or distortion to previously formed layers during the successive coating process and they involve coating only liquid formulations of preferably low viscosity. Furthermore, they omit to recognize very important parameters involved in the coating process such as the effects of having both solid and liquid regions present during the formation of the thin liquid layers, the effects of fluid flow and rheological characteristics of the liquid, the tendency for thin photohardened layers to easily become distorted by fluid flow during coating, and the effects of weak forces such as hydrogen bonds and substantially stronger forces such as mechanical bonds and vacuum or pressure differential forces on those thin layers and on the part being formed.

The Hull patent, for example, describes a dipping process where a platform is dipped below the distance of one layer in a vat, then brought up to within one layer thickness of the surface of the photohardenable liquid. Hull further suggests that low viscosity liquids are preferable but, for other practical reasons, the photohardenable liquids are generally high viscosity liquids. Motion of the platform and parts, which have cantilevered or beam regions (unsupported in the Z direction by previous layer sections) within the liquid, creates deflections in the layers, contributing to a lack of tolerance in the finished part. In addition, this method is rather slow.

U.S. Pat. No. 2,775,758, issued to O. J. Munz on Dec. 25, 1956, and the Scitex application describe methods by which the photohardenable liquid is introduced into a vat by means of a pump or similar apparatus such that the new liquid level surface forms in one layer thickness over the previously exposed layers. Such methods have the aforementioned disadvantages of the Hull method except that the deflection of the layers during coating is reduced.

The patent issued to Fudim describes the use of a transmitting material to fix the surface of a photopolymer liquid to a desired shape, assumably flat, through which photopolymers of desired thickness are solidified. The transmitting material is usually rigid and either coated or inherently non-adherent to the solidified photopolymer. The methods described by Fudim do not address the problems inherent in separating such a transmitting material from a photopolymer formed in intimate contact with the surface of the transmitting material. Whereas the effects of chemical bonding may be reduced significantly by suitable coatings or inherently suitable films, the mechanical bonds along with hydrogen bonds, vacuum forces, and the like are still present and in some cases substantial enough to cause damage or distortion to the photopolymer during removal from the transmitting material surface.

Fabrication of three-dimensional objects from sheets of laminated solid photocurable compositions have been disclosed in the Scitex application, in the Japanese Patent Application SHO 63-45540 dated Feb. 27, 1988, which was laid open to the public under No HEI 1-218831 on Sept. 1, 1989, as well as in the International Publication WO 89/11680 A1, with a Publication Date of Nov. 30, 1989. There are two serious disadvantages, among others, in using laminated solid films for fabricating three dimensional objects. First, the photocuring and adhesion of the layers to each other are difficult since the mobility of the photoactive groups is considerably reduced in a solid structure as compared to the mobility of similar groups in a less rigid structure, such as for example a gel or a liquid structure. Second, removal of the remaining parts of the laminated sheets after photocuring is also difficult, due to the structural strength as well as the solvent resistance of these parts, properties necessarily imparted to the sheets in order to withstand the conditions of the processes described therein.

An apparatus and method for forming an integral three dimensional object from laminations is disclosed in U.S. Pat. No. 4,752,352, issued to Feygin on June 21, 1988. The apparatus includes a supply station, a work station for forming a material into a plurality of laminations, an assembling station for stacking the laminations in sequence, and bonding the laminations to complete the three-dimensional object.

Also, Fudim in U.S. Pat. No. 4,752,498, discloses a method to produce complex objects by treating photopolymers with radiation through a transparent material which would preferably exclude air, and building separately a number of three dimensional portions or slices, that have two surfaces which are capable of further cross-linking, and attaching the slices together. The slices can be then joined by radiation, preferably in the absence of oxygen and other inhibitors.

SUMMARY OF THE INVENTION

The present invention provides a method and apparatus for fabricating an integral three-dimensional object from a multiplicity of cross sectional portions of the object. The cross sectional portions correspond to photohardened portions of contiguous photoformed precursor sheets of a photohardenable liquid composition.

More particularly, the instant invention pertains to an improved method for fabricating an integral three-dimensional object by imagewise exposing successive photohardenable sheets to actinic radiation, said method including containing a photohardenable liquid composition within a vessel. The improvement in said method comprises:

(a) exposing to actinic radiation a first area of the composition to photoform a precursor sheet;

(b) transferring the precursor sheet to a second area of the composition;

(c) exposing imagewise the precursor sheet to produce photohardened and non-photohardened areas;

(d) exposing again to actinic radiation the first area of the composition to photoform a new precursor sheet;

(e) transferring the new precursor sheet to the second area of the composition on top of the previously imagewise exposed precursor sheet;

(f) exposing imagewise the new precursor sheet to also produce photohardened and non-photohardened areas; and (g) repeating steps (d) through (f) until the three dimensional object has been completed.

In more detail, the present invention is directed to a method for fabricating an integral three-dimensional object from a multiplicity of cross sectional portions of the object, the cross sectional portions corresponding to photohardened portions of contiguous photoformed precursor sheets of a photohardenable liquid composition, comprising the steps of:

(a) entirely exposing to actinic radiation a first area of the composition adequately to photoform a first precursor sheet having high enough integrity to be handled and transferred without being destroyed, but still maintaining the integrity low enough, so that the precursor sheet remains subject to destruction in a disintegrative environment;

(b) transferring the sheet to a second area;

(c) imagewise exposing to actinic radiation the transferred precursor sheet in a pattern corresponding to a respective cross sectional portion of the object, adequately to photoharden the cross sectional portion, the sheet being thus segregated to a photohardened portion and to a non-photohardened portion;

(d) entirely exposing to actinic radiation the first area of the composition adequately to photoform a new precursor sheet having high enough integrity to be handled and transferred without being destroyed, but still maintaining the integrity low enough, so that the new precursor sheet remains subject to destruction in a disintegrative environment;

(e) transferring and depositing the new sheet on the sheet previously subjected to steps (a) through (c);

(f) imagewise exposing to actinic radiation the newly deposited precursor sheet in a pattern corresponding to another respective cross sectional portion of the object, adequately to photoharden and connect the photohardened portion to any immediately underlying photohardened portion, the new sheet being also segregated to a photohardened portion and to a non-photohardened portion; and (g) repeating steps (d) through (f) until all cross-sectional portions corresponding to the three-dimensional object have been completed and connected to each other.

The present invention also pertains to an apparatus for fabricating an integral three-dimensional object from a multiplicity of cross sectional portions of the object, the cross sectional portions corresponding to photohardened portions of contiguous photoformed precursor sheets of a photohardenable liquid composition, comprising:

a first exposure element for entirely exposing to actinic radiation a first area of the composition to photoform a precursor sheet;

means for transferring the precursor sheet from the first area to the second area; and a second exposure element for imagewise exposing to actinic radiation the precursor sheet in a second area in a pattern corresponding to the cross sectional portion of the object.

BRIEF DESCRIPTION OF THE DRAWINGS

The reader's understanding of practical implementation of preferred embodiments of the invention will be enhanced by reference to the following detailed description taken in conjunction with perusal of the drawing figures, wherein.

DETAILED DESCRIPTION OF THE PREFERRED EMBODIMENTS

Figure 1:
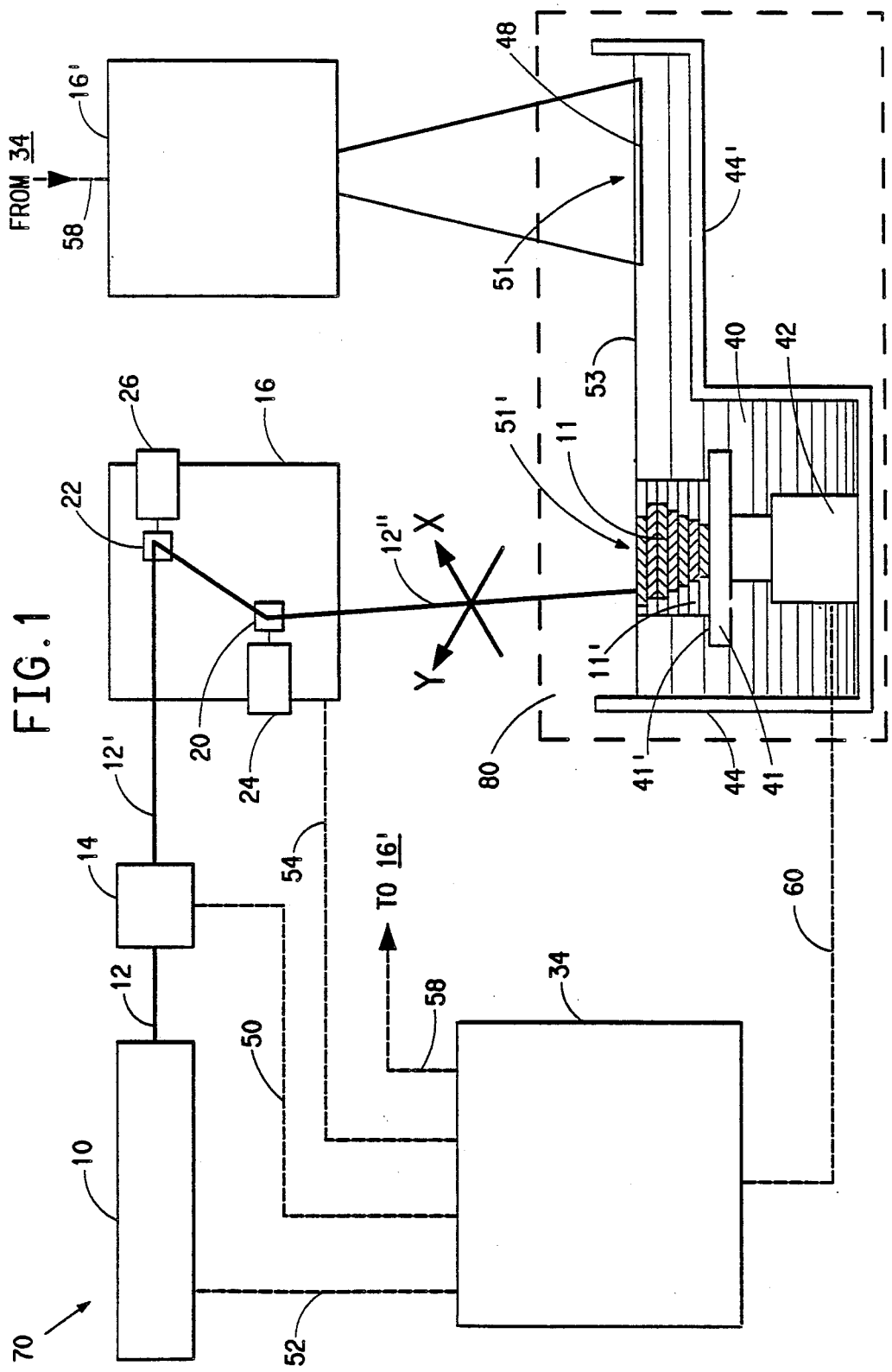
FIG. 1 is a diagrammatic view showing the preferred embodiment of this invention.

The present invention is directed to method and apparatus for fabricating an integral three-dimensional object from a multiplicity of cross sectional portions of the object. The cross sectional portions correspond to photohardened portions of contiguous photoformed precursor sheets of a photohardenable liquid composition. Initially, a precursor sheet is photoformed by entirely exposing to actinic radiation a first area of the composition adequately to produce the precursor sheet with high enough integrity to be handled and transferred to a second area without being destroyed, but still with low enough integrity, so that the precursor sheet remains subject to destruction in a disintegrative environment. After the sheet has been transferred to the second area, it is imagewise exposed to actinic radiation in a pattern corresponding to the cross sectional portion of the object, adequately to photoharden the cross sectional portion. Another sheet is then photoformed using the same technique, and it is transferred and deposited on the previously treated precursor sheet. The newly deposited precursor sheet is again imagewise exposed to actinic radiation in a pattern corresponding to another respective cross sectional portion of the object, adequately to be photohardened and be connected to the photohardened portion of any immediately underlying photohardened portion. The same procedure is repeated until all cross-sectional portions corresponding to the three-dimensional object have been completed and connected to each other. The non-photohardened portions may then be easily removed by either mechanical means or by use of solvents. The precursor sheets may be in the form of individual pieces being stacked and imagewise exposed one on top of the other, or they may be a continuous sheet, preferably being rolled and imagewise exposed to actinic radiation during the process of rolling.

Some of the main advantages of the method and apparatus of this invention using precursor sheets as compared to the teachings of the related art disclosing use of uncured solid sheets to make three dimensional objects, are:

The precursor sheets (as compared to solid uncured sheets) are produced in the same apparatus by the same simple technique of photoimaging, which is used for photohardening the respective cross sectional portions of the three dimensional object. Thus, separate handling and stocking of sheets is eliminated.

Since the precursor sheets (as compared to solid uncured sheets) are immediately used and minimally handled, they do not have to possess strong structural properties, and thus they may have a very low $T_g$, which facilitates faster rate of photohardening and better bonds between photohardened layers.

The method itself of photoforming the precursor sheets inherently provides them with at least one of the two surfaces less photocured than the main body of the sheet, as it will be explained hereinbelow, which provides excellent adhesion of one sheet to the other at the later photohardened areas, while it still reduces considerably shrinkage and promotes flatness and accuracy.

Since the precursor sheets do not have to possess strong structural properties, their non-photohardened portions may be removed considerably more easily than the necessarily structurally stronger uncured parts of the sheets disclosed in the related art, in order to produce the final three-dimensional object.

FIG. 1 is a diagrammatic view showing the preferred embodiment of this invention. There is provided an imaging station 70 including a radiation source 10, a modulator 14, a computer 34, a first exposure element 16', and a second exposure element 16. There is also provided a work station 80. The radiation means 10 is preferably a laser, producing a radiation beam 12. Being desirable to produce solid objects at high speed, the apparatus of the instant invention preferably utilizes relatively high power radiation means 10, such as a high power laser, which may have major bands in the visible, infrared, or ultraviolet regions. High power is considered to be a power greater than 20 mW, and preferably over 100 mW as measured from the intensity of radiation beam 12. The selection of a certain type of laser should be coordinated with the selection of the photohardenable composition in a way that the sensitivity of the photohardenable composition agrees reasonably well with the wavelength of the laser's emission. Other types of radiation means may also be utilized such as electron beams, x-rays, and the like, as long as their energy type is matched with the sensitivity of the photohardenable composition, and the appropriate conditions for their handling are observed according to established ways, well known in the art. Although means may be provided to modify the shape of the beam cross-section to any desirable shape, the ordinary shape is circular, and the profile of the intensity of the beam is gaussian with a maximum at the center of the circular shape.

The radiation beam 12 passes through the modulator 14, which is preferably an acousto-optical modulator. The modulated radiation beam 12' passes in turn through the second exposure element 16, which comprises two mirrors 20 and 22, each mirror having an axis (not shown), allowing reflection of the beam towards the work station 80 in the X and Y directions, the X and Y directions being perpendicular to each other. The mirrors 20 and 22 may rotatably move around their corresponding axes by means of motors 24 and 26, respectively for controllably deflecting the beam in a vector scanning mode, in the X and Y directions towards predetermined positions of the work station 80.

As the beam is guided by the second exposure element 16, it assumes an acceleration from zero level to a maximum acceleration and a velocity from zero level to a maximum constant velocity. The velocity and the intensity of the beam remain proportional to each other, so that the exposure remains substantially constant. The beam 12" exposes imagewise preselected portions of a precursor sheet as described below. For the purposes of this invention in general, the radiation beam 12" may be not only a focused beam from a laser, but also other light source or light, modified in a number of different ways. For example, it may be transmitted through any type of variable optical density photomask such as a liquid crystal display, silver halide film, electro-deposited mask etc., or reflected off of any variable optical density device, such as a reflective liquid crystal cell. In that respect, exposure elements 16 and 16' may also comprise or constitute such devices, or they may even be in the form of beams of actinic radiation.

The function of the first exposure element 16' is to provide actinic radiation to a first area 51 of the composition in order to produce a precursor sheet 48, as it will be explained in more detail later. The second exposure element 16 can be used by itself to perform all functions. However, by using only the second exposure element 16 which is preferably a scanner, the speed of forming the three dimensional object may be reduced considerably. It is, therefore, advantageous in most occasions to use a combination of exposure elements 16, and 16', especially because the first exposure element 16' may provide repeatable and/or continuous flood exposure. The preferred type of scanning is vector scanning. However, for the purposes of this invention any other type of scanning may be used, such as example raster, helical, and the like. Also any other type of exposing imagewise may be used, such as a variable optical density photomask, and the like.

The work station 80 comprises a vessel 44 for containing the photohardenable composition 40 which presents a free surface 53. The vessel 44 has preferably a shallow segment 44', over which the precursor sheet 48 may be made in a first area 51. A platform 41 having an upper surface 41' is disposed within the vessel 44. The position of the platform 41 is controlled by placement means 42. The placement means 42 may be completely immersed in the composition 40 as shown in FIG. 1 for simplicity purposes, or more preferably it may be positioned at an area external to the vessel 44 and operated through a bent supporting arm passing around the top of the vessel in order to be connected to and support the platform 41. There are also provided means (not shown in the figure for simplicity purposes) for transferring the photoformed precursor sheet 48 from the first area 51 to the second area 51'. Any conventional device which may gently grab the sheet 48 at the area 51 and gently pull it to the area 51' is suitable for this purpose. It is desirable to maintain the contact area of the grabbing device with the sheet large enough to avoid tearing of the sheet.

A number of communication lines 50, 52, 54, 58 and 60, are also provided for the computer 34 to control the modulator 14, the radiation source 10, the second exposure element 16, the first exposure element 16', and the placement means 42, respectively. The means for transferring the precursor sheet from the first to the second area are also controlled by the computer 34. Controlling different components and functions by a computer with data stored in the computer is a conventional and well known art.

In operation of the preferred embodiment of this invention, the first exposure element 16' entirely exposes to actinic radiation the first area 51 of the composition adequately to produce a first precursor sheet 48 in a way that the sheet has high enough integrity to be handled and transferred to the second area 51' without being destroyed, but still maintaining the integrity of the sheet low enough, so that the precursor sheet remains subject to destruction in a disintegrative environment. This condition is important so that at a later stage, part of the sheet 48 may be removed easily, while initially it may still be gently handled without damage during the transfer process to the second area 51'. Optimization of the desired structural properties of the precursor sheet 48 is a very simple matter of coordinating the characteristics of the composition 40 with the exposure.

The first precursor sheet 48 is then transferred to the second area 51', where it is deposited on the upper surface 41' of the platform 41. The upper surface 41' of the platform 41, and also the second area 51' are preferably at this point in the vicinity of the free surface 53 of the composition 40. The term "vicinity of the free surface" denotes the region contained within the thickness of one sheet above and one sheet below the free surface 53, with preference to the region above the free surface. After the sheet 48 has been deposited on the upper surface 41' of the platform 41, it is exposed imagewise to actinic radiation by the beam 12" in a pattern corresponding to a respective cross sectional portion of the three dimensional object. The exposure is adequate to photoharden the cross sectional portion, thus segregating the sheet to a photohardened portion 11 and to a non-photohardened portion 11'. The exposure is preferably also high enough to ensure adherence of the photohardened portion of the first precursor sheet to the upper surface 41' of the platform 41.

Another precursor sheet is photoformed in the same manner and deposited on the first precursor sheet, where it is again imagewise exposed to actinic radiation by the beam 12" in a pattern corresponding to another respective cross sectional portion of the object. The exposure is adequate to photoharden and connect the photohardened portion to any immediately underlying photohardened portions of the previous layer. The new sheet is thus also segregated to a photohardened portion and to a non-photohardened portion. In most cases it is desirable that at the same time when a precursor sheet is imagewise photohardened in the second position 51, a new precursor sheet is being formed at the first position 51' for the operation to be faster.

The same procedure is repeated until all cross-sectional portions corresponding to the three-dimensional object have been completed and connected to each other.

The three dimensional object, being a photohardened mass surrounded by easily removable non-photohardened portions of the precursor sheets, may be withdrawn from the platform and treated further. The non-photohardened portions may be then removed either by mechanical means, such as brushing, shaking, mild sanding, blowing of gas, such as air or nitrogen for example, or liquid, such as water for example, and the like, or by dissolving them partially or totally in solvents which do not substantially affect the photohardened portions. The selection of the solvent or solvents depends on the nature of the photohardenable composition, the degree of exposure for the photoformation of the precursor sheet, and the degree of photohardening during the imagewise exposure step. Combination of mechanical means and solvent means is very effective in this respect.

Figure 2:
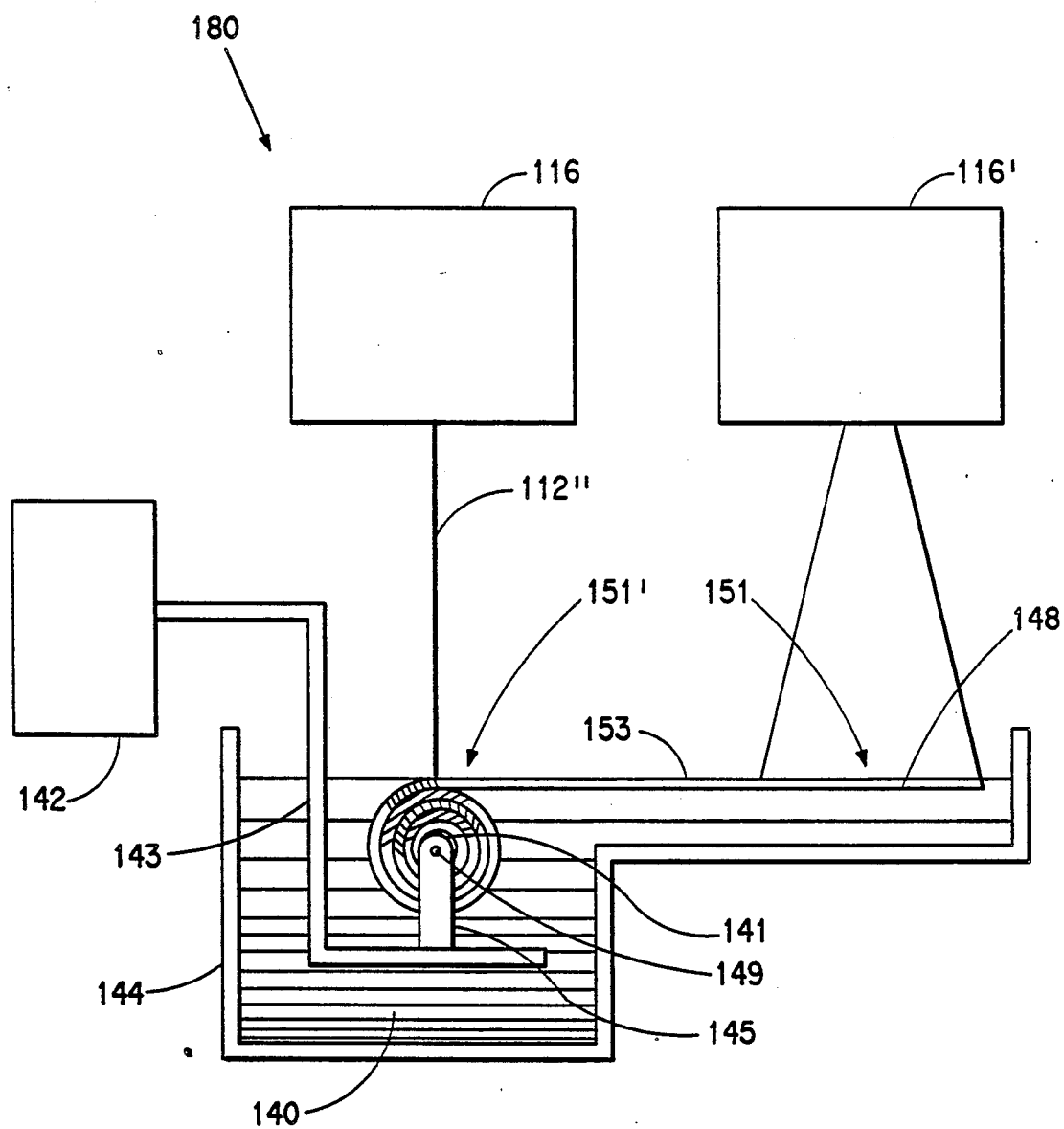
FIG. 2 is an elevation view showing an alternate preferred embodiment of the present invention.

FIG. 2 illustrates the work station 180 of a different embodiment of this invention. The imaging station is substantially the same as the imaging station 70 shown in FIG. 1. Here also, there is provided a vessel 144 for containing a photohardenable composition 140. The work station 180 comprises also a roller 141, which is turnable by any conventional means, such as a motor, through a shaft 149, which in turn is mounted at one end of a base 145. The other end of the base 145 is secured on a supporting bent arm 143, which may be raised or lowered by placement means 142.

The operation of this embodiment is similar to the operation of the embodiment of FIG. 1, except as indicated hereinafter. A first exposure element 116', exposes to actinic radiation a first area 151 entirely and continuously photoform a precursor sheet, which is continuously pulled and wound around the roller 141. The roller 141 is positioned by the placement means such that part of the continuous precursor sheet 148 is always present at a second position 151', preferably in the vicinity (as earlier defined) of the free surface 153 of the photohardenable composition 140. As the sheet is being rolled on roller 141, it is also subjected to imagewise exposure of actinic radiation provided by a laser beam 112" through a second exposure element 116, in order to be photohardened in a pattern corresponding to the cross sectional configuration of the three dimensional object. After photohardening of the three dimensional object, the non photohardened portions are removed by any of the techniques discussed above.

Regardless of whether the precursor sheet is photoformed continuously or in segments, one or both types of exposures may be through a solid transparent element in contact with the photohardenable composition. In such occasions it is preferable that photohardening inhibition conditions prevail at the interface of the transparent element and the photohardenable composition, in order to avoid adherence of the precursor sheet to the transparent element.

Since the exposure to actinic radiation decreases with depth due to absorption, scattering, and other radiation losses, the surface opposite to the one from which the exposure is provided will necessarily be less cured than the main body of the precursor sheet during the sheet's formation. The decreased cure will be also gradual rather than abrupt, which promotes better blending of one sheet with the next one at a later stage of the process, and reduces localized stresses, which in turn improves adhesion. If the surface of the sheet from which the exposure is provided is in an environment which tends to inhibit curing or photohardening, then the sheet will have both surfaces at a less cured status than the main body of the sheet. This is even more effective in the respect discussed above. In the cases where oxygen is an inhibitor of the photohardening process, for example from the atmosphere, the precursor sheet photoformed as illustrated in FIGS. 1 and 2, will have both surfaces less cured than the main body of precursor sheet. Most free radical polymerizations are inhibited more or less by oxygen. In the embodiments shown in FIGS. 1 and 2, the precursor sheet is photoformed in an environment where the surface of the sheet from which the exposure is made is subject to inhibition from the oxygen in the air, provided the photohardenable composition may be inhibited by oxygen.

The photohardenable compositions which may be used in the practice of the present invention are any compositions which undergo solidification under exposure to actinic radiation. Such compositions comprise usually but not necessarily a photosensitive material and a photoinitiator. The word "photo" is used here to denote not only light, but also any other type of actinic radiation which may transform a deformable composition, preferably a liquid, to a solid by exposure to such radiation. Cationic or anionic polymerization, as well as condensation and free radical polymerization and combinations thereof are examples of such behavior. Cationic polymerization is preferable, and free radical polymerization even more preferable.

One or more monomers may be used in the composition. Monomers may be mono-, difunctional, trifunctional or multifunctional acrylates, methacrylates, vinyl, allyl, and the like. They may comprise other functional and/or photosensitive groups such as epoxy, vinyl, isocyanate, urethane, and like, either by themselves if they are capable of rendering the monomer photoformable, or in addition to acrylates or methacrylates. Examples of suitable ethylenically unsaturated monomers which can be used alone or in combination with other monomers include but are not limited to t-butyl acrylate and methacrylate, 1,5-pentanediol diacrylate and dimethacrylate, N,N-diethylaminoethyl acrylate and methacrylate, ethylene glycol diacrylate and dimethacrylate, 1,4-butanediol diacrylate and dimethacrylate, diethylene glycol diacrylate and dimethacrylate, hexamethylene glycol diacrylate and dimethacrylate, 1,3-propanediol diacrylate and dimethacrylate, decamethylene glycol diacrylate and dimethacrylate, 1,4-cyclohexanediol diacrylate and dimethacrylate, 2,2-dimethylolpropane diacrylate and dimethacrylate, glycerol diacrylate and dimethacrylate, tripropylene glycol diacrylate and dimethacrylate, glycerol triacrylate and trimethacrylate, trimethylolpropane triacrylate and trimethacrylate, pentaerythritol triacrylate and trimethacrylate, polyoxyethylated trimethylolpropane triacrylate and trimethacrylate and similar compounds as disclosed in U.S. Pat. No. 3,380,831, 2,2-di(p-hydroxyphenyl)-propane diacrylate, pentaerythritol tetraacrylate and tetramethacrylate, 2,2-di-(p-hydroxyphenyl)-propane dimethacrylate, triethylene glycol diacrylate, polyoxyethyl-2,2-di(p-hydroxyphenyl)propane dimethacrylate, di-(3-methacryloxy-2-hydroxypropyl) ether of bisphenol-A, di-(2-methacryloxyethyl) ether of bisphenol-A, di-(3-acryloxy-2-hydroxypropyl) ether of bisphenol-A, di-(2-acryloxyethyl) ether of bisphenol-A, di-(3-methacryloxy-2-hydroxypropyl) ether of 1,4-butanediol, triethylene glycol dimethacrylate, polyoxypropyltrimethylol propane triacrylate, butylene glycol diacrylate and dimethacrylate, 1,2,4-butanetriol triacrylate and trimethacrylate, 2,2,4-trimethyl-1,3-pentanediol diacrylate and dimethacrylate, 1-phenyl ethylene-1,2-dimethacrylate, diallyl fumarate, styrene, 1,4-benzenediol dimethacrylate, 1,4-diisopropenyl benzene, and 1,3,5-triisopropenyl benzene. Also useful are ethylenically unsaturated compounds having a molecular weight of at least 300, e.g., alkylene or a polyalkylene glycol diacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages particularly when present as terminal linkages. Also included are all methacrylates, tetrahydro- furfuryl methacrylate, cyclohexyl methacrylate, diallylfumarate, n-benzylacrylate, carbowax 550 acrylate, methyl cellosolve acrylate, dicyclopentenyl acrylate, isodecyl acrylate, 2(2-ethoxyethoxy) ethylacrylate, poybutadiene diacrylate, tris (2-hydroxyethyl) iso cyanurate triacrylate, epoxy diacrylate tetrabromo bisphenol A diacrylate. Monomers with vinyl group like vinyl pyrol, N-vinyl pyrrolidone and vinyl ethers are usable. Also, oligomers with mono or multifunctional groups such as the ones with carbon group for alkali removability, and the ones with both acrylate and isocyanate end groups are useful. Particularly preferred monomers are polyoxyethylated trimethylolpropane triacrylate, ethylated pentaerythritol triacrylate, dipentaerythritol monohydroxypentaacrylate and 1,10-decanediol dimethylacrylate. Others are caprolactone acrylates and methacrylates, propoxylated neopentyl glycol diacrylates and methacrylates.

Di-(3-acryloxy-2-hydroxypropyl) ether of bisphenol A and Di-(3-methacryloxy-2-hydroxypropyl) ether of bisphenol A oligomers, generally referred to as unsaturated bisphenol A oligomers are of particular interest because they provide higher photospeed; also urethane diacrylates and methacrylates with aliphatic or aromatic backbones, referred to as unsaturated urethane oligomers are of particular interest, because they provide both higher photospeed and higher flexibility.

Monomers which expand on polymerization can be used in part with the standard monomers to achieve compositions giving no shrinkage or warpage upon exposure. These monomers are based on polycyclic ring opening mechanisms. Spiro orthocarbonates, spiroorthoesters and bicyclic ortho esters are known to belong to this class. Typical monomers are norborene spiro orthocarbonate, and bismethylene spiro orthocarbonate. Monomers which undergo cationic polymerization are also useful in this invention. Representative classes of monomers are cyclic ethers cyclic formals and acetals, lactones, vinyl monomers, sulfur containing monomers, organosilicone monomers, monofunctional epoxies, difunctional epoxies, epoxy prepolymers and higher oligomers and epoxy end-capped silicone resins. They can be found in the open literature. One such reference is "Photoinitiated cationic polymerization" by James V. Crivello in "UV Curing: Science and Technology" edited by S. P. Pappas, published by Technology Marketing Corporation, 1978. Other ring opening monomers can be found in "Ring Opening Polymerization" Edited by K. J. Ivin and T. Saegusa, Elsevier Applied Science Publishers, London and New York, 1984.

Examples of photoinitiators which are useful in the present invention alone or in combination are described in U.S. Pat. No. 2,760,863 and include vicinal ketaldonyl alcohols such as benzoin, pivaloin, acyloin ethers, e.g., benzoin methyl and ethyl ethers, benzil dimethyl ketal; a-hydrocarbon-substituted aromatic acyloins, including a-methylbenzoin a-allylbenzoin and a-phenylbenzoin, others are 1-hydroxycyclobenyl phenol ketone, diethoxyphenol acetophenone, 2-methyl-1-[4-(methyl thio)phenyl], 2-morpholino-propane-1, benzophenone, michler's ketone, substituted triphenyl imidazolyl dimers with chain transfer agent camphoquinone etc. Photoreducible dyes and reducing agents disclosed in U.S. Pat. Nos. 2,850,445, 2,875,047, 3,097,096, 3,074,974, 3,097,097 and 3,145,104, as well as dyes of the phenazine, oxazine, and quinone classes, Michler's ketone, benzophenone, acryloxy benzophenone, 2,4,5-triphenylimidazolyl dimers with hydrogen donors including leuco dyes and mixtures thereof as described in U.S. Pat. Nos. 3,427,161, 3,479,185 and 3,549,367 can be used as initiators. Also useful with photoinitiators and photoinhibitors are sensitizers disclosed in U.S. Pat No. 4,162,162. The photoinitiator or photoinitiator system is present in 0.05 to 10% by weight based on the total weight of the photoformable composition. Other suitable photoinitiation systems which are thermally inactive but which generate free radicals upon exposure to actinic light at or below 185° C. include the substituted or unsubstituted polynuclear quinones which are compounds having two intracyclic carbon atoms in a conjugated carbocyclic ring system, e.g., 9,10-anthraquinone, 2methylanthraquinone, 2-ethylanthraquinone, 2-tertbutylanthraquinone, octamethylanthraquinone, 1,4-naphthoquinone, 9,10-phenanthraquinone, benz(a)anthracene-7,12-dione, 2,3-naphthacene-5,12-dione, 2-methyl-1,4-naphthoquinone, 1,4-dimethyl-anthraquinone, 2,3-dimethylanthraquinone, 2-phenylanthraquinone, 2,3-diphenylanthraquinone, retenequinone, 7,8,9,10-tetrahydronaphthacene-5,12-dione, and 1,2,3,4-tetrahydrobenz(a)anthracene-7,12-dione. Also, alpha amino aromatic ketones, halogenated compounds like Trichloromethyl substituted cyclohexadienones and triazines or chlorinated acetophenone derivatives, thioxanthones in presences or tertiary amines, and titanocenes.

Typical classes of initiators for cationic polymerization are aryldiazonium salts, diaryliodonium salts comprising nonnucleophilic counterions such as $SbF_6-$, $BF_4-$, $PF_6-$, $ClO_4-$, $CF_3SO_3-$, $AsF_6-$, triacylsulfonium salts, triarylselenium salts or Iron arene complex. Examples of these include but are not limited to 2,5-diethoxy-4-(p-tolylmercapto) benzene diazonium $PF_6-$, 4-dimethylamine-naphthalene diazonium $PF_6-$, diphenyliodonium hexafluoroarsenate, di-t-butyldiphenyliodonium hexaflurophosphate FX-512 sulfonium salt (by 3M Company), triethylsulfonium iodide, CG24-61 (by Ciba Geigy).

One good reference book is Photoinitiation of Cationic Polymerization mentioned earlier.

Sensitizers useful with these photoinitiators for radical polymerization include but are not limited to methylene blue and those disclosed in U.S. Pat. Nos. 3,554,753; 3,563,750; 3,563,751; 3,647,467; 3,652,275; 4,162,162; 4,268,667; 4,351,893; 4,454,218; 4,535,052; and 4,565,769. A preferred group of sensitizers include the bis(p-dialkylaminobenzylidine) ketones disclosed in Baum et al., U.S. Pat. No. 3,652,275 and the arylyidene aryl ketones disclosed in Dueber, U.S. Pat. No. 4,162,162, as well as in U.S. Pat. Nos. 4,268,667 and 4,351,893. Useful sensitizers are also listed in Dueber, U.S. Pat. No. 4,162,162 column 6, line 1 to line 65. Particularly preferred sensitizers include the following: DBC, i.e., cyclopentanone; 2,5-bis-[4-(diethylamino)-2-methylphenyl]methylene]-; DEAW, i.e., cyclopentanone, 2,5-bis[4-(diethylamino)phenyl]methylene]-; dimethoxy-JDI, i.e., 1H-inden-1-one, 2,3-dihydro-5,6-dimethoxy-2-[(2,3,6,7-tetrahydro-1H,5H-benzo[i,j-]quinolizin-9-yl)methylene]-, and JAW, i.e., cyclopentanone, 2,5-bis[(2,3,6,7-tetrahydro-1H,5H-b-enzo[i,j-]quinolizin-1-yl)methylene]-. Also useful are cyclopentanone 2,5-bis[2-(1,3-dihydro-1,3,3-trimethyl-2H-indol-2-ylidene)ethylidene], CAS 27713-85-5; and cyclopentanone, 2,5-bis-[2-ethylnaphtho[1,2-d]thiazol-2(1H)ylidene)ethylidene], CAS 27714-25-6.

Sensitizers for cationic polymerization include but are not limited to perylene, acridine orange, acridine yellow, phosphene R, benzoflavin & Setoflavin T.

Hydrogen donor compounds useful as chain transfer agents in the photopolymer compositions include: 2-mercaptobenzoxazole, 2-mercapto-benzothiazole, 4-methyl-4H-1,2,4,triazole-3-thiol, and the like; as well as various types of compounds, e.g., (a) ethers, (b) esters, (c) alcohols, (d) compounds containing allylic or benzylic hydrogen cumene, (e) acetals, (f) aldehydes, and (g) amides as disclosed in column 12, lines 18 to 58 of MacLachlan, U.S. Pat. No. 3,390,996.

Other components may also be present in the photoformable compositions, e.g., dyes, pigments, extenders, organic or inorganic fillers, organic or inorganic reinforcement fibers, polymerization inhibitors, thermal stabilizers, viscosity modifiers, interlayer and generally interfacial adhesion promoters, such as organosilane coupling agents, coating aids, etc., so long as the photoformable compositions retain their essential properties.

Although the Applicants have herein disclosed specific preferred embodiments of the instant invention, the general scope of this invention is limited only by the appended claims and their equivalents.

What is claimed is:

1. In a method for fabricating an integral three-dimensional object by imagewise exposing successive photohardenable sheets to actinic radiation, said method including containing a photohardenable liquid composition within a vessel, the improvement in said method comprising:
    (a) exposing to actinic radiation a first area of the composition to photoform a not completely cured precursor sheet;
    (b) transferring the precursor sheet to a second area of the composition;
    (c) exposing imagewise the precursor sheet to produce photohardened and non-photohardened areas;
    (d) exposing again to actinic radiation the first area of the composition to photoform a new precursor sheet;
    (e) transferring the new precursor sheet to the second area of the composition on top of the previously imagewise exposed precursor sheet;
    (f) exposing imagewise the new precursor sheet to also produce photohardened and non-photohardened areas; and
    (g) repeating steps (d) through (f) until the three dimensional object has been completed.

2. A method for fabricating an integral three-dimensional object from a multiplicity of cross sectional portions of the object, the cross sectional portions corresponding to photohardened portions of contiguous photoformed precursor sheets of a photohardenable liquid composition, comprising the steps of:
    (a) entirely exposing to actinic radiation a first area of the composition adequately to photoform a first precursor sheet having high enough integrity to be handled and transferred without being destroyed, but still maintaining the integrity low enough, so that the precursor sheet remains subject to destruction in a disintegrative environment;
    (b) transferring the sheet to a second area;
    (c) imagewise exposing to actinic radiation the transferred precursor sheet in a pattern corresponding to a respective cross sectional portion of the object, adequately to photoharden the cross sectional portion, the sheet being thus segregated to a photohardened portion and to a non-photohardened portion;
    (d) entirely exposing to actinic radiation the first area of the composition adequately to photoform a new precursor sheet having high enough integrity to be handled and transferred without being destroyed, but still maintaining the integrity low enough, so that the new precursor sheet remains subject to destruction in a disintegrative environment;
    (e) transferring and depositing the new sheet on the sheet previously subjected to steps (a) through (c);
    (f) imagewise exposing to actinic radiation the newly deposited precursor sheet in a pattern corresponding to another respective cross sectional portion of the object, adequately to photoharden and connect the photohardened portion to any immediately underlying photohardened portion, the new sheet being also segregated to a photohardened portion and to a non-photohardened portion; and
    (g) repeating steps (d) through (f) until all cross-sectional portions corresponding to the three-dimensional object have been completed and connected to each other.

3. A method as defined in claim 1 or 2, further comprising the step of removing the non-photohardened portions.

4. A method as defined in claim 3, wherein the exposing steps (a) and (d) are performed by flood exposing.

5. A method as defined in claim 3, wherein the imagewise exposing steps (c) and (f) are performed by a laser beam.

6. A method as defined in claim 3, wherein the imagewise exposing steps (c) and (f) are performed through a variable optical density photomask.

7. A method as defined in claim 3, wherein the entirely exposing steps (a) and (d) are performed by a laser beam.

8. A method as defined in claim 3, wherein the precursor sheet is formed in a continuous manner in the first area, and it is wound in the form of a roll in the second area.

9. A method as defined in claim 3, wherein the photohardenable composition presents a free surface, and the first area is part of the free surface.

10. A method as defined in claim 9, wherein the second area is in the vicinity of the free surface.

11. A method as defined in claim 10, wherein the first precursor sheet is deposited on a platform.

12. A method as defined in claim 11, further comprising the step of lowering the platform by the thickness of a cross-sectional portion after step (c) and before step (e).

* * * * *